(12) United States Patent
Stephens

(10) Patent No.: US 10,129,112 B2
(45) Date of Patent: Nov. 13, 2018

(54) WORKFLOW-BASED RESOURCE MANAGEMENT

(71) Applicant: AT&T Intellectual Property I, L.P., Atlanta, GA (US)

(72) Inventor: Robert Todd Stephens, Fayetteville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 181 days.

(21) Appl. No.: 14/459,831

(22) Filed: Aug. 14, 2014

(65) Prior Publication Data

US 2016/0050158 A1 Feb. 18, 2016

(51) Int. Cl.
*H04L 12/26* (2006.01)
*H04L 29/08* (2006.01)

(52) U.S. Cl.
CPC .......... *H04L 43/04* (2013.01); *H04L 43/0817* (2013.01); *H04L 67/10* (2013.01); *H04L 67/1008* (2013.01)

(58) Field of Classification Search
CPC ...... G06F 9/455; G06F 9/5072; G06F 9/5077; G06F 9/5083; G06F 9/5027; G06F 9/505; H04L 29/08144
See application file for complete search history.

(56) References Cited

U.S. PATENT DOCUMENTS

| 8,336,049 | B2 | 12/2012 | Medovich | |
|---|---|---|---|---|
| 8,560,671 | B1 | 10/2013 | Yahalom et al. | |
| 8,589,336 | B1* | 11/2013 | Levy | G06F 3/0484 |
| | | | | 707/602 |
| 8,612,330 | B1 | 12/2013 | Certain et al. | |
| 8,706,798 | B1* | 4/2014 | Suchter | G06F 9/5038 |
| | | | | 709/202 |
| 8,738,333 | B1 | 5/2014 | Behera et al. | |
| 8,756,609 | B2 | 6/2014 | Dasgupta et al. | |
| 9,466,036 | B1* | 10/2016 | Vicaire | G06F 9/5027 |
| 2002/0172222 | A1* | 11/2002 | Ullmann | H04L 41/0213 |
| | | | | 370/468 |

(Continued)

OTHER PUBLICATIONS

Weijters, Anton JMM, and Wil MP Van der Aalst. "Rediscovering workflow models from event-based data using little thumb." Integrated Computer-Aided Engineering 10.2 (2001): 151-162.*

(Continued)

*Primary Examiner* — Scott B Christensen
*Assistant Examiner* — Lam T Do
(74) *Attorney, Agent, or Firm* — Hartman & Citrin LLC

(57) ABSTRACT

Concepts and technologies are disclosed herein for workflow-based resource management. A process can execute a resource management application. The process can obtain load data that describes a resource load associated with resources. The processor can analyze the load data to detect a change in resource load associated with one of the resources and identify workflows that includes the resource. The workflows can include a description of how the resources are utilized during execution of a process by the resources. The processor can identify a relevant workflow that is associated with the process and issue commands to resources associated with the relevant workflow to proactively adjust capacity of the resources associated with the relevant workflow.

18 Claims, 6 Drawing Sheets

(56) References Cited

U.S. PATENT DOCUMENTS

| | | | |
|---|---|---|---|
| 2004/0216114 A1* | 10/2004 | Lin | G06F 9/5083 |
| | | | 718/105 |
| 2006/0167891 A1* | 7/2006 | Blaisdell | G06F 11/3495 |
| 2006/0200450 A1* | 9/2006 | Keane | G06F 17/30595 |
| 2008/0172312 A1* | 7/2008 | Synesiou | G06Q 10/00 |
| | | | 705/34 |
| 2008/0262824 A1* | 10/2008 | Oslake | G06F 8/20 |
| | | | 703/22 |
| 2008/0271039 A1* | 10/2008 | Rolia | G06Q 10/06 |
| | | | 718/105 |
| 2009/0307597 A1 | 12/2009 | Bakman | |
| 2011/0022812 A1* | 1/2011 | van der Linden | G06F 9/5077 |
| | | | 711/163 |
| 2011/0029970 A1 | 2/2011 | Arasaratnam | |
| 2011/0126207 A1* | 5/2011 | Wipfel | H04L 9/3213 |
| | | | 718/104 |
| 2011/0131331 A1* | 6/2011 | Brunson | H04L 41/0896 |
| | | | 709/227 |
| 2012/0072762 A1* | 3/2012 | Atchison | G06F 9/5072 |
| | | | 714/2 |
| 2012/0324095 A1* | 12/2012 | Barzel | G06F 9/5088 |
| | | | 709/224 |
| 2013/0191527 A1 | 7/2013 | Ashok et al. | |
| 2013/0304903 A1 | 11/2013 | Mick et al. | |
| 2013/0346969 A1 | 12/2013 | Chanmuganathan et al. | |
| 2014/0013311 A1* | 1/2014 | Garrett | G06F 8/443 |
| | | | 717/128 |
| 2014/0026144 A1* | 1/2014 | Pack | G06F 9/505 |
| | | | 718/105 |
| 2014/0058871 A1 | 2/2014 | Marr et al. | |
| 2014/0082612 A1 | 3/2014 | Breitgand et al. | |
| 2014/0137110 A1 | 5/2014 | Engle et al. | |
| 2015/0067171 A1* | 3/2015 | Yum | G06F 9/5072 |
| | | | 709/226 |
| 2015/0156095 A1* | 6/2015 | Lu | H04L 47/70 |
| | | | 709/224 |
| 2015/0160974 A1* | 6/2015 | Kishore | G06F 9/4881 |
| | | | 718/106 |

OTHER PUBLICATIONS

Weijters, A.J.M.M., and Wil M.P. Van Der Aalst. "Rediscovering Workflow Models from Event-Based Data." Https://www.researchgate.net/profile/A_Weijters/publication/229125124_Rediscovering_Workflow_Models_from_Event-Based_Data/links/00b49529ef9f3190af000000.pdf. ResearchGate, Jan. 2001. Web. Sep. 23, 2016.*

Shackleford, Dave. "Monitoring Security and Performance on Converged Traffic Networks." Https://www.sans.org/reading-room/whitepapers/analyst/monitoring-security-performance-converged-traffic-networks-34720. SANS Institute, Apr. 2008. Web. Sep. 23, 2016.*

Gulati et al., "Cloud-Scale Resource Management: Challenges and Techniques," Proceedings of the 3rd USENIX conference on hot topics in cloud computing, 2011, USENIX Association.

"Managing Capacity Using VMware VCenter CapacityIQ," Technical White Paper, 2010, VMware, Inc.

Tenenbaum, Yuval, "VMware Cloud Operations-vCenter Operations," VMware VForum, Jun. 2014, VMware, Inc.

Jiang et al., "Cloud Analytics for Capacity Planning and Instant VM Provisioning," 2013, IEEE.

* cited by examiner

WORKFLOW-BASED RESOURCE MANAGEMENT

BACKGROUND

With the movement of many computing operations from local computing devices to remote devices or distributed computing environments, management of the resource capacity may be difficult. According to various approaches used today, when a resource lacks capacity to handle a particular task, the resource may cause a bottleneck in various traffic flows. To address these bottlenecks, the resources may scale their capacity up or down. In some instances, network operators may monitor resource usage and create new resources when a resource becomes overloaded or cannot satisfy a current demand.

Thus, some approaches to resource demand fluctuations include monitoring resource usage and creating new or duplicate resources when the resource lacks capacity to satisfy current needs. Alternatively, the resources themselves may be configured to request or scale in response to detected capacity needs. Similarly, the resources may determine that once-over-utilized resources are now underutilized, and therefore may tear down or otherwise terminate resources to attempt to reduce wasted resources. Monitoring resources in this manner may be time consuming and/or expensive, and time lags caused by this reactionary approach can impact quality of service and/or customer satisfaction.

SUMMARY

The present disclosure is directed to workflow-based resource management. A computer system such as a server computer can host a resource management application. The resource management application can receive one or more reports from various entities. The reports can include process identifiers or other data that identifies a process, data that identifies one or more resources used or engaged during execution of the process, time data that illustrates times during the process at which and/or during which the resources are used or experience changes, and/or other data such as baseline or historical load information, capacity capabilities, combinations thereof, or the like. The resource management application can analyze the reports and generate, based upon the reports, one or more workflows. The workflows can indicate resources associated with a process, how capacity of the resources is used to perform the process, times during the process at which the capacity changes begin, occur, end, combinations thereof, or the like. In some other embodiments, the workflows can be generated by network operators or other entities at various times and may or may not be generated by the resource management application. Thus, the workflows can be generated by the resource management application or by additional and/or alternative entities at various times and/or for various reasons and used by the resource management application to provide the concepts and technologies described herein.

The resource management application can be configured to monitor the resources or obtain information relating to the resources from a resource monitor or other device or entity. In some instances, the resource monitor can submit load data to the resource management application. The load data can indicate loads associated with the resources at various times. The resource management application can analyze the load data to detect a load change at one or more of the resources. In some contemplated embodiments, the resource management application can detect the load changes by comparing the load data to historical or baseline loads that may be known for various resources and/or may be obtained via the reports or other information, by comparing one instance of the load data to a previous iteration or instance of the load data, combinations thereof, or the like. Analysis of the load data by the resource management application may result in a determination by the resource management application that a capacity increase or decrease is occurring or will occur at one or more of the resources.

The resource management application can identify a resource associated with a load change indicated by the load data and query the workflows for one or more workflows that include the identified resource. In some embodiments, more than one workflow may be identified by the resource management application. As such, the resource management application can analyze the workflows to identify one or more relevant workflows based on various information. The resource management application can analyze the relevant workflow and determine resources associated with the workflow. The resource management application also can analyze the relevant workflow to identify capacity changes associated with the resources and times during the process at which the identified capacity changes will occur.

Based upon these determinations, the resource management application can generate one or more commands for proactively controlling capacity of the resources. The resource management application can issue commands to the resources to control the capacity of the resources and to prevent service or quality of service degradation. The commands can indicate when capacity should be changed, how long the change should persist, and/or when the change should be reverted. In some embodiments, the commands can indicate multiple changes such as a first increase, a second increase, a third increase, and a decrease back to an original level or other level. It should be understood that this example is illustrative and therefore should not be construed as being limiting in any way.

According to one aspect of the concepts and technologies disclosed herein, a method can include obtaining, at a processor executing a resource management application, load data that describes a resource load associated with resources. The processor can analyze the load data to detect a change in resource load associated with one of the resources. The method also can include identifying, by the processor, workflows that include the resource, the workflows including a description of how the resources are utilized during execution of a process by the resources. The method also can include identifying, by the processor, a relevant workflow that is associated with the process, and issuing, by the processor, commands to resources associated with the relevant workflow to proactively adjust capacities of the resources associated with the relevant workflow.

In some embodiments, the method further can include monitoring the resources associated with the relevant workflow to determine if a load change has again occurred. In some embodiments, the commands can include instructions to adjust a capacity of the resources associated with the relevant workflow. The commands also can include time information that indicates a time at which an adjustment to the capacity is to be made. In some embodiments, the load data can be obtained from a resource monitor.

In some embodiments, the workflows can be generated by the processor and stored at a data storage device. In some embodiments, generating the workflows can include obtaining reports. Each of the reports can indicate a process that can be executed by the resources, resource utilization associated with the process, and time data defining times during the process at which the resources can be utilized. Generating the workflows further can include generating the workflows based upon the reports and storing the workflows at the data storage device. In some embodiments, the reports can be received from a resource monitor.

In some embodiments, the reports can be received from packets that traverse the resources during a process. The reports can include data indicating baseline loads associated with the resources, and in some embodiments, analyzing the load data to detect the load change can include comparing the load data to the data indicating baseline loads to detect the load change. In some embodiments the commands can include instructions to adjust a capacity of the resources associated with the relevant workflow and time information that indicates a first time at which a first adjustment to the capacity is to be made and a second time at which a second adjustment to the capacity is to be made. In some other embodiments, the resources can be configured to control capacity adjustment by issuing commands to other resources in the workflow. A linear or non-linear approach can be used in these embodiments.

According to another aspect of the concepts and technologies disclosed herein, a system is disclosed. The system can include a processor and a memory. The memory can store computer-executable instructions that, when executed by the processor, cause the processor to perform operations. The operations can include obtaining load data that describes a resource load associated with resources, analyzing the load data to detect a change in resource load associated with one of the resources, and identifying workflows that can include the resource. The workflows can include a description of how the resources can be utilized during execution of a process by the resources. The operations further can include identifying a relevant workflow that can be associated with the process, and issuing commands to resources associated with the relevant workflow to proactively adjust capacities of the resources associated with the relevant workflow.

In some embodiments, the commands can include instructions to adjust a capacity of the resources associated with the relevant workflow and time information that can indicate a time at which an adjustment to the capacity is to be made. The workflows can be generated and stored at a data storage device. Generating the workflows can include obtaining reports, wherein each of the reports indicates a process that can be executed by the resources, resource utilization associated with the process, and time data defining times during the process at which the resources can be utilized. Generating the workflows further can include generating the workflows based upon the reports, and storing the workflows at the data storage device. In some embodiments, the reports can include data indicating baseline loads associated with the resources. Analyzing the load data to detect the load change can include comparing the load data to the data indicating baseline loads to detect the load change.

According to yet another aspect of the concepts and technologies disclosed herein, a computer storage medium is disclosed. The computer storage medium can have computer-executable instructions stored thereon that, when executed by a processor, cause the processor to perform operations. The operations can include obtaining load data that describes a resource load associated with resources, analyzing the load data to detect a change in resource load associated with one of the resources, and identifying workflows that can include the resource. The workflows can include a description of how the resources can be utilized during execution of a process by the resources. The operations further can include identifying a relevant workflow that can be associated with the process, and issuing commands to resources associated with the relevant workflow to proactively adjust capacities of the resources associated with the relevant workflow.

In some embodiments, the commands can include instructions to adjust a capacity of the resources associated with the relevant workflow, and time information that can indicate a time at which an adjustment to the capacity is to be made. The workflows can be generated and stored at a data storage device. Generating the workflows can include obtaining reports, wherein each of the reports indicates a process that can be executed by the resources, resource utilization associated with the process, and time data defining times during the process at which the resources can be utilized. Generating the workflows further can include generating the workflows based upon the reports and storing the workflows at the data storage device.

In some embodiments, the reports can include data indicating baseline loads associated with the resources. Analyzing the load data to detect the load change can include comparing the load data to the data indicating baseline loads to detect the load change. In some embodiments, the computer-executable instructions, when executed by the processor, can cause the processor to perform operations further can include monitoring the resources associated with the relevant workflow to determine if a load change has again occurred, and if a determination is made that the load change has again occurred, generating further commands to adjust capacities of the resources.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
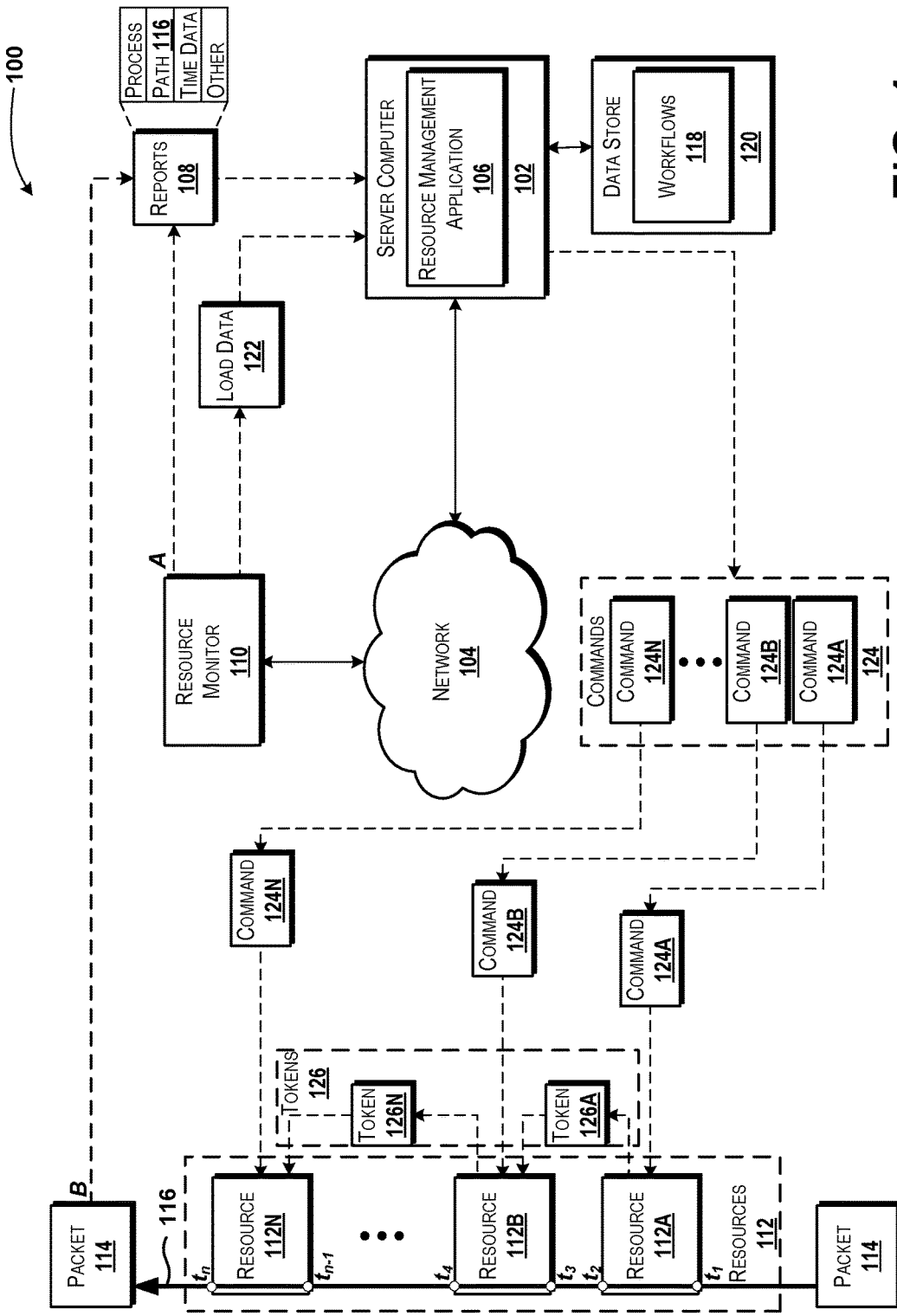
FIG. 1 is a system diagram illustrating an illustrative operating environment for various embodiments of the concepts and technologies described herein.

The following detailed description is directed to workflow-based resource management. A computer system such as a server computer can host a resource management application. The resource management application can receive one or more reports from various entities. The reports can include process identifiers or other data that identifies a process, data that identifies one or more resources used or engaged during execution of the process, time data that illustrates times during the process at which and/or during which the resources are used or experience changes, and/or other data such as baseline or historical load information, capacity capabilities, combinations thereof, or the like. The resource management application can analyze the reports and generate, based upon the reports, one or more workflows. The workflows can indicate resources associated with a process, how capacity of the resources is used to perform the process, times during the process at which the capacity changes begin, occur, end, combinations thereof, or the like. In some other embodiments, the workflows can be generated by network operators or other entities at various times and may or may not be generated by the resource management application. Thus, the workflows can be generated by the resource management application or by additional and/or alternative entities at various times and/or for various reasons and used by the resource management application to provide the concepts and technologies described herein.

The resource management application can be configured to monitor the resources or obtain information relating to the resources from a resource monitor or other device or entity. In some instances, the resource monitor can submit load data to the resource management application. The load data can indicate loads associated with the resources at various times. The resource management application can analyze the load data to detect a load change at one or more of the resources. In some contemplated embodiments, the resource management application can detect the load changes by comparing the load data to historical or baseline loads that may be known for various resources and/or may be obtained via the reports or other information, by comparing one instance of the load data to a previous iteration or instance of the load data, combinations thereof, or the like. Analysis of the load data by the resource management application may result in a determination by the resource management application that a capacity increase or decrease is occurring or will occur at one or more of the resources.

The resource management application can identify a resource associated with a load change indicated by the load data and query the workflows for one or more workflows that include the identified resource. In some embodiments, more than one workflow may be identified by the resource management application. As such, the resource management application can analyze the workflows to identify one or more relevant workflows based on various information. The resource management application can analyze the relevant workflow and determine resources associated with the workflow. The resource management application also can analyze the relevant workflow to identify capacity changes associated with the resources and times during the process at which the identified capacity changes will occur.

Based upon these determinations, the resource management application can generate one or more commands for proactively controlling capacity of the resources. The resource management application can issue commands to the resources to control the capacity of the resources and to prevent service or quality of service degradation. The commands can indicate when capacity should be changed, how long the change should persist, and/or when the change should be reverted. In some other embodiments, the resources can be configured to control capacity adjustment by issuing commands to other resources in the workflow. A linear or non-linear approach can be used in these embodiments.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for workflow-based resource management will be described, according to an illustrative embodiment. The operating environment 100 shown in FIG. 1 includes a server computer 102 operating in communication with and/or as part of a communications network ("network") 104.

According to various embodiments, the functionality of the server computer 102 may be provided by one or more server computers, web servers, desktop computers, workstations, smartphones, laptop computers, embedded computing systems, network controller devices, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer that includes a data storage device such as a memory or mass storage device and a processor that executes instructions stored in the data storage device. It should be understood that this embodiment is illustrative, and should not be construed as being limiting in any way.

The server computer 102 can execute an operating system (not shown in FIG. 1) and one or more application programs such as, for example, a resource management application 106. The operating system can include a computer program for controlling the operation of the server computer 102. The resource management application 106 can include an executable program configured to execute on top of the operating system to provide the functionality described herein for providing workflow-based resource management.

Although the resource management application 106 is illustrated as being executed by the server computer 102, it should be understood that the resource management application 106 may be embodied as or in a stand-alone device or component thereof operating as part of or in communication with the network 104 and/or the server computer 102. Thus, in some embodiments the resource management application 106 can operate as a resource management service, or the like, and can be called or invoked by other devices, applications, program functions, combinations thereof, or the like. According to various embodiments, the resource management application 106 can be called or invoked by various entities such as those listed above. As such, the illustrated embodiment should be understood as being illustrative of only some contemplated embodiments and should not be construed as being limiting in any way.

The resource management application 106 can be configured to obtain network traffic data, information, logs, and/or reports ("reports") 108. The reports 108 can be obtained, in some embodiments, from a network resource monitor ("resource monitor") 110. The resource monitor 110 can monitor or obtain information associated with network traffic and/or network resource utilization from various entities associated with a network such as the network 104. In the embodiment illustrated in FIG. 1, the resource monitor 110 can monitor or obtain monitoring data relating to one or more resources 112A-N (hereinafter collectively and/or generically referred to as "resources 112").

The resources 112 can include various types of network resources such as, for example, server computers, data storage devices, data and/or signal processing devices, load balancers, packet and/or traffic inspection devices, traffic monitors, firewalls, mail servers, application servers, buffer devices, combinations thereof, or the like. In some embodiments, the concepts and technologies described herein can be configured to monitor other types of devices such as network connectivity devices, which can include, for example, WiFi hotspots, routers, switches, cellular connectivity devices, or the like. Thus, the concepts and technologies described herein also can be used to provide workflow-based network connectivity device management in a manner that may be substantially similar or even identical to the concepts and technologies described herein for managing the resources 112. It should be noted, however, that network connectivity devices such as those mentioned in this paragraph are not "resources" as recited in the claims unless the claims recite the phrase "network connectivity device" or a grammatical variant thereof.

The reports 108 can include data or information that indicates various types of information relating to the resources 112 and/or traffic among, between, and/or through the resources 112. In some embodiments, for example, the reports 108 can indicate traffic flow through the resources 112. For example, the reports 108 can indicate how one or more packets, such as the packet 114, move across or through the resources 112 during a particular process or at other times. The reports 108 also can indicate how a packet 114 may prompt or cause capacity usage of resources 112, even if the packet 114 does not actually move across or through those resources 112. Thus, the reports 108 can include data that indicates, for example, a path 116 as illustrated in FIG. 1. The path 116 can represent or describe how packets 114 move through or across the resources 112, how a packet that engages or encounters one resource 112 may result in the utilization or use of another resource 112, combinations thereof, or the like.

By way of example, an order process for an online merchant or marketplace may be represented by a path 116. In this non-limiting example, a path 116 may represent usage of resources 112 associated with an order process that is initiated by receipt of a packet 114. The packet 114 may be associated with an initial request generated by a user such as, for example, accessing a marketplace site or the like. As can be seen in FIG. 1, the path 116 can involve at least resources 112A, 112B, and 112N (resources 112 between the resource 112B and the resource 112N are illustrated by an ellipsis in FIG. 1).

In the example of a merchant purchase process, the resource 112A can correspond to web server that can host and/or provide a landing page, home page, marketplace site, or the like to a requestor such as a shopper. Thus, the packet 114 can engage the resource 112A, for example by accessing the web server by typing the corresponding uniform resource locator ("URL") or the like. It should be understood that this example is illustrative and therefore should not be construed as being limiting in any way.

While visiting the site, the shopper or other entity may enter a search query. The search query may correspond to a search for a particular product or service in some embodiments. It can be appreciated that execution of the query generated or submitted by the shopper or other entity may involve another resource 112. In the illustrated embodiment, the search can involve the resource 112B, which can include, for example, a database that stores a product or service catalog, a query or search engine, combinations thereof, or the like.

The shopper or other entity may select a product or service returned by the search query. It should be understood that the selection of the search result or query result may occur using the resource 112A, where the search or query results may be loaded into the marketplace site or the like, though this is not explicitly illustrated with respect to the path 116 shown in FIG. 1. Via selection of the good or service, the shopper or other entity may begin or prompt execution of a purchasing process using another resource 112, for example the resource 112N. The resource 112N may include a shopping cart platform, or the like, and therefore may complete the purchase process including payment verification, shipping, procurement, and the like. It can be appreciated that various resources 112 may not be shown in FIG. 1 for the sake of brevity and/or clarity. As such, it should be understood that the example path 116 is illustrative and should not be construed as being limiting in any way.

The reports 108 can represent the resources 112 involved in a particular process (e.g., the purchase process described above), as well as data or information that can identify the process. In the above example, the data identifying the process could include text or other data that specifies a purchase process at a merchant "X." It should be understood that this example is illustrative and therefore should not be construed as being limiting in any way.

In some embodiments, the reports 108 that are generated and/or used as described herein also can include capacity information, resource usage information, and/or resource load information relating to one or more of the resources 112. This resource usage and/or load information can include current usage and/or load information, in some embodiments. In some other embodiments, the resource usage and/or load information can include baseline load information, historical load information, combinations thereof, or the like. It should be understood that the capacity and/or load information may be unrelated to the path 116. Thus, the reports 108 can be generated by the resource monitor 110 (as illustrated by the line labeled "A" in FIG. 1) and can indicate load/capacity information associated with one or more resources 112, in some instances, while in other instances the reports 108 can represent movement of traffic across or through the resources 112. It should be understood that these examples are illustrative and therefore should not be construed as being limiting in any way.

In some other embodiments, the reports 108 can be generated by one or more packets 114 (as illustrated by the line labeled "B" in FIG. 1). In these embodiments as well, the reports 108 can indicate or represent movement of traffic across or through the resources 112, usage of resources 112 with respect to a process, and/or load/capacity information associated with one or more resources 112 at a current time, with respect to a process, and/or at other times. In one contemplated embodiment, the packet 114 can correspond to a trace packet and/or can include a flag, header, or other identifier that can be used to determine and/or represent the path 116 as the trace packet moves through the resources 112. Thus, the packet 114 can capture identifying information associated with each resource 112 the packet 114 encounters or that the packet 114 determines is used during a process. The packet 114 can provide that and/or other information to the resource management application 106 as the reports 108 or a component thereof. It should be understood that this example is illustrative and therefore should not be construed as being limiting in any way.

Regardless of where and/or how the reports 108 are generated, the reports 108 can be received by the resource management application 106 and used for various purposes as illustrated and described herein. In particular, the resource management application 106 can analyze the reports 108 and determine, based upon the contents of the report 108, a process associated with the report 108. The resource management application 106 also can analyze the report 108 to identify data that represents a path 116 associated with the process represented by the report 108. Thus, the resource management application 106 can identify resources 112 traversed, invoked, and/or used during the process based upon the report 108. The reports 108 also can include time information relating to the path 116, which is explained in more detail below.

The resource management application 106 can analyze the reports 108 and generate one or more workflows 118 based upon the reports 108. A workflow 118 can identify or represent various aspects of resource usage associated with a particular process. The workflows 118 can include data in various formats for representing this information. In some embodiments, for example, the workflows 118 can be stored as text files that represent resources 112 invoked by a particular process. For example, a workflow 118 can be a text file that includes a title or identifier for the process associated with the workflow 118, followed by text indicating one or more resources 112 invoked during that process. It should be understood that the resources 112 can be identified in various ways such as device identifiers, Internet protocol ("IP") addresses, media access control ("MAC") addresses, other network identifiers, resource names, URLs, combinations thereof, or the like.

In the above example of a purchase process through an online merchant, for example, a workflow 118 can describe a purchase process for a merchant named X, and can indicate that the resources 112A, 112B, 112A, and 112N are used during the process. In one example, the workflow 118 can include text such as, for example, "{merchantX purchase process; 112A, 112B, 112A, 112N}," where "merchantX" can correspond to a URL or merchant name associated with the purchase process, and wherein the identifiers of the resources (in this case 112A, 112B, 112N) can correspond to resource names or other identifiers that can identify the resources 112 used during the process. It should be understood that this example is illustrative and therefore should not be construed as being limiting in any way.

The workflows 118 also can include time information associated with a particular flow. Thus, for example, the workflows 118 can indicate a total elapsed time that can represent how much time passes from the beginning of a process to the completion of the process. The workflows 118 also can identify other times associated with the process such as times between or during various phases of the process. In the above example of a purchase process at an online merchant, the workflow 118 can indicate, for example, that from the time the packet 114 encounters a first resources 112A in the path 116, an average of two hundred fifty seconds will lapse until the path 116 and/or capacity usage associated with the path 116 is complete. It should be understood that this example is illustrative and therefore should not be construed as being limiting in any way.

Furthermore, in the above example, the workflow 118 may indicate that the resource 112A is involved for the first thirty seconds; that the resource 112B is involved for five seconds beginning after the first thirty seconds; that the resources 112A is again involved for one hundred eighty seconds after the first thirty five seconds, and that the resource 112N is involved for thirty five seconds after the first two hundred fifteen seconds. In this example of a purchase process through an online merchant, a workflow 118 can include the text "{merchantX purchase process; 112A, $t_1$-$t_2$; 112B, $t_2$-$t_3$; 112A, $t_3$-$t_4$; 112N, $t_4$-$t_5$}," where the various times can be indicated in any desired units including, but not limited to, milliseconds (ms), seconds, minutes, hours, or the like. Because the number of resources 112 and/or their respective time information can vary widely according to the process and/or other factors, it should be understood that these example resources 112, associated flow through the resources 112, and time information are all illustrative and therefore should not be construed as being limiting in any way.

In the example shown in FIG. 1, the packet 114 arrives at the first resource 112A at a first time $t_1$. As noted above, the packet 114 can correspond to a request or other data that can arrive at the resource 112A. The resource 112A can be used for a process triggered by the packet 114 from $t_1$ until a second time $t_2$. The resource 112B can be used for a process triggered by the packet 114 from a third time $t_3$ until a fourth time $t_4$. Various resources 112 can be involved in the process until an nth resource 112N, which can be used from an (n−1)th time $t_{n-1}$ until an nth time $t_n$. Based on this information, which can be represented in the reports 108, the resource management application 106 can determine a total elapsed time ($\Delta t$) for execution of the process represented by the path 116 by determining a time change between the first time $t_1$ and the nth time $t_n$. Similarly, resource utilization times can be determined for each resource 112 as illustrated and described above in detail with regard to the purchase process example.

In the example illustrated in FIG. 1, the reports 108 can indicate that the resource 112A is used from $t_1$ to $t_2$; the resource 112B is used from $t_3$ to $t_4$, and that the resource 112N is used from $t_{n-1}$ to $t_n$. Similarly, the resource management application 106 can determine, based upon the reports 108, time periods that lapse between initiation of a particular process represented by the path 116 at a resource 112A, and utilization of the resources 112B and 112N. It should be understood that these examples are illustrative and therefore should not be construed as being limiting in any way.

According to various embodiments, the resource management application 106 can store the workflows 118 at a local or remote data storage location or device such as, for example, a data store 120, or the like. The functionality of the data store 120 can be provided by one or more databases, server computers, desktop computers, mobile telephones, laptop computers, other computing systems, and the like. In the illustrated embodiments, the functionality of the data store 120 can be provided by a server computer storing a database, which can be in communication with the server computer 102. It should be understood that this example is illustrative and therefore should not be construed as being limiting in any way.

According to various embodiments of the concepts and technologies described herein, the resource management application 106 also can obtain load data 122 from the resource monitor 110 and/or other network entities. The resource management application 106 can determine, based upon the load data 122, that a resource 112 such as the resource 112A has experienced a change in its load or utilization. The change in load can be due to various events or triggers such as, for example, beginning of a sale, beginning of a coupon period, advertising, news events, and/or various other causes. Because load changes can occur due to various events and/or triggers, and because any of the resources 112 can experience load changes, it should be understood that these examples are illustrative and therefore should not be construed as being limiting in any way.

The resource management application 106 can query the workflows 118 to identify one or more workflows 118 that include the resource 112A (or another resource 112 at which a packet 114 associated with a load change has been received). The resource management application 106 can determine which of the returned workflows 118 relates to the load change detected. In some embodiments, the resource management application 106 can obtain a report 108 that can provide information that indicates a process with which the load change was detected. Because the resource management application 106 can identify the process in additional and/or alternative ways, it should be understood that this example is illustrative and therefore should not be construed as being limiting in any way.

The resource management application 106 can query the workflows 118 for a workflow 118 associated with the process identified. In some other embodiments, the resource management application 106 may obtain load data 122 associated with two or more resources 112, and the resource management application 106 can identify workflows 118 that include the two or more resources 112. It can be appreciated that using two or more resources 112 to identify the workflows 118 by way of a query may reduce the number of returned workflows 118 and/or the analysis required to identify the process associated with the load change, in some embodiments.

The resource management application 106 can identify the relevant workflow 118, and identify one or more resources 112 associated with the workflow 118 identified. As such, the resource management application 106 can analyze the workflow 118 to identify the resources 112 associated with the workflow 118. In some embodiments, the resource management application 106 also can analyze the workflow 118 to identify time data associated with the workflow 118. As explained above, the workflows 118 can include not only data indicating the resources 112 associated with a particular process, but also time information associated with the process such as, for example, total elapsed time associated with the process, time for which resources 112 are utilized during the process, and the like.

The resource management application 106 can be configured to determine resources 112 that will experience load changes in the future. This determination of the resource management application 106 can be based upon a time at which the packet 114 arrived at the resource 112 associated with the detected load change; a process associated with the load change; a workflow 118 identified based upon the identification of the process or the resource 112; time data included in the workflow 118; combinations thereof; or the like. For example, the resource management application 106 may determine that a load change has been detected at a resource 112B, and that a workflow 118 indicates that the process will result in a load change of positive twenty three percent at the resource 112B for three minutes and a contemporaneous load change of negative ten percent at the resource 112A for three minutes, followed by a load change of positive fifty percent at a resource 112N for two minutes.

Based upon the above illustrative determinations, the resource management application 106 can determine that the resource 112B will experience a twenty three percent increase in load for the next three minutes, that the resource 112A will experience a ten percent decrease in load for the next three minutes, and that the resource 112N will experience a fifty percent increase in load for two minutes beginning in three minutes. It should be understood that this example is illustrative and therefore should not be construed as being limiting in any way.

Based on the various determinations that can be made by the resource management application 106, which can include determinations of resources 112 that will experience load changes as well as times at which the resources 112 will experience load changes, the resource management application 106 can generate one or more commands 124A-N (hereinafter collectively and/or generically referred to as "commands 124"). The commands can instruct the resources 112 to adjust their capacity proactively. In other words, the resource management application 106 can, through issuing the commands 124, prompt the resources 112 to adjust their capacity proactively to satisfy an anticipated increased capacity demand associated with the process (and the corresponding load increase).

In addition to instructing the resources 112 to increase capacity, the commands 124 can instruct the resources 112 to decrease capacity after the process has completed and/or at other times associated with the process. In accordance with the above example of determining capacity changes and associated times for those capacity changes, the commands 124 can include a command 124B to increase the capacity of the resource 112B by twenty three percent for the next three minutes, followed by a decrease back to the previous level after three minutes. Similarly, the commands 124 can include a command 124A to increase the capacity of the resource 112A by ten percent for the next three minutes, followed by a decrease back to the previous level after three minutes. Finally (in this example), the commands 124 can include a command 124N to increase the capacity of the resource 112N by fifty percent in three minutes, and then to decrease the capacity of the resource 112N back to the previous level after two minutes. It should be understood that this example is illustrative and therefore should not be construed as being limiting in any way.

In practice, the resource management application 106 can receive one or more reports 108 that can include process identifiers or other data that identifies a process, data that identifies a path 116 associated with the process, time data that illustrates times during the process at which and/or during which the resources 112 experience changes, and/or other data such as current load information, capacity capabilities, historical load information, combinations thereof, or the like. The resource management application 106 can analyze the reports 108 and generate, based upon the reports 108, one or more workflows 118. The workflows 118 can indicate resources 112 associated with a process, how capacity of the resources 112 is used to perform the process, times during the process at which the capacity changes occur/end, combinations thereof, or the like.

In some other embodiments, the workflows 118 can be generated by network operators or other entities at various times. Thus, the workflows 118 can be generated by the resource management application 106 or by additional and/or alternative entities at various times and/or for various reasons and used by the resource management application 106 to perform the concepts and technologies described herein. In one contemplated embodiment, a network operations entity can create a workflow 118 when processes or resources 112 are introduced and submit the workflow 118 to the resource management application 106 for storage and/or use. It should be understood that this example is illustrative and therefore should not be construed as being limiting in any way.

The resource management application 106 can be configured to monitor the resources 112, in some embodiments. In some other embodiments, the resources 112 can be monitored by the resource monitor 110. The resource monitor 110 can submit load data 122 to the resource management application 106. The load data 122 can indicate loads associated with the resources 112 at various times. In some embodiments, the resource management application 106 can analyze the load data 122 to detect a load change at one or more of the resources 112. In some contemplated embodiments, the resource management application 106 can compare the load data 122 to historical or baseline loads that may be known for various resources 112 and/or may be obtained via the reports 108 or other information. Analysis of the load data 122 by the resource management application 106 may result in a determination by the resource management application 106 that a capacity increase or decrease is occurring or will occur at one or more of the resources 112.

The resource management application 106 can identify a resource 112 associated with a load change indicated by the load data 122 and query the workflows 118 for one or more workflows 118 that include the identified resource 112. In some embodiments, more than one workflow 118 may be identified by the resource management application 106. The load data 122 can identify, in some embodiments, a process associated with the load change or the resource management application 106 can identify the process based upon other aspects of the load data 122 such as other affected resources 112, time of day, information submitted to the resource management application 106 such as traffic planning information submitted by customers, other considerations, or the like. If the load data 122 identifies the process, the resource management application 106 can identify the workflow 118 based upon that information.

Regardless of how the resource management application 106 identifies the process, the resource management application 106 can identify a workflow 118 associated with the identified process. The resource management application 106 can analyze the workflow 118 and determine resources 112 associated with the workflow 118. The resource management application 106 also can identify capacity changes associated with the resources 112 and times during the process at which the identified capacity changes will occur.

Based upon these determinations, the resource management application 106 can generate one or more commands 124 for proactively controlling capacity of the resources 112. Thus, instead of waiting for capacity to increase at the resources 112 associated with a particular workflow 118 or process, the resource management application 106 can proactively increase or decrease capacity for the resources 112 to ensure that service is not interrupted or degraded during the anticipated capacity change. Thus, embodiments of the concepts and technologies described herein can be used to guarantee and/or improve service, quality of service, performance of resources 112, process completion times, traffic flow, or the like. It should be understood that these examples are illustrative and therefore should not be construed as being limiting in any way.

It should be appreciated that in some embodiments, the resource management application 106 can issue commands 124 based on triggers other than the load data 122 illustrated and described in FIG. 1. For example, the resource management application 106 can receive data from other devices that indicate that a particular resource 112 may experience a load increase and/or that execution of a particular process is likely to occur in the future.

By way of example, a marketplace may be a customer of the resource management application 106 and may be configured to provide data to the resource management application 106. The data may indicate that an advertisement is going to be published, that a sale is scheduled to commence, that load is expected to increase, combinations thereof, or the like. The data provided by the customer also can request that the resource management application 106 plan changes in resources 112 to meet the expected load changes. Thus, it can be appreciated that the functionality of the resource management application 106 illustrated and described herein can be provided to various entities as a service, and that customers can provide information to the resource management application 106 to provide the functionality illustrated and described herein. As such, the resource management application 106 can be a service that can be called, requested, or invoked, in some embodiments. It should be understood that this example is illustrative and therefore should not be construed as being limiting in any way.

Although the above description of FIG. 1, has described the resource management application 106 issuing commands 124 to each of the resources 112, some embodiments of the concepts and technologies described herein are configured to control the resources 112 using one or more resource-generated commands ("tokens") 126A-N (hereinafter collectively and/or generically referred to as "tokens 126"). In some of these embodiments, the resource management application 106 can detect a load change at a resource 112, for example the resource 112A.

The resource management application 106 can generate the command 124A and send the command 124A to the resource 112A. The resource 112A (and the other resources 112) can execute an application that can be configured to identify other resources 112 involved in a process being executed by the resource 112A and generate the token 126A. The token 126A can indicate to the resource 112B that the resource 112B should adjust its capacity as illustrated and described above with reference to the command 124B. The resource 112B, in turn, can generate the token 126N, which can be substantially similar to the command 124N. As such, the resources 112 can detect capacity changes and inform other resources 112 using the tokens 126 to cause the resources 112 to adjust their capacities in accordance with the detected changes at the resource 112A.

In some embodiments, the resources 112 can practice a linear load adjustment approach. Thus, if the resource 112A detects an increase of X percent, for example, the resource 112A can indicate, in the token 126A, that the resource 112B should increase its capacity by the same X percent. Similarly, the resource 112B can indicate, in the token 126N, that the resource 112N should increase its capacity by the same X percent. Alternatively, the token 126N can specify a different capacity increase, for example where the resource 112B determines that Y percent of the traffic load increase at the resource 112A will drop out of the process before reaching the resource 112N. In such a case, the resource 112B may generate the token 126N with an instruction that the resource 112N should increase its capacity by X percent times (1−Y). It should be understood that this example is illustrative and therefore should not be construed as being limiting in any way.

Thus, some embodiments of the concepts and technologies described herein can remove much of the computing analysis needed to determine how the resource capacity of the resources 112 will be adjusted by basing this determination solely upon changes at the resource 112, which can include a linear approach to adjusting capacity. This embodiment can be useful where computing power may be at a premium. In some other embodiments, the embodiments of the concepts and technologies described herein for controlling each resource 112 based upon the workflows 118 and/or the time information can ensure that each resource 112 is adjusted based on known or determined information and not merely based upon changes at the resource 112A.

FIG. 1 illustrates one server computer 102, one network 104, one resource monitor 110, three resources 112, and one data store 120. It should be understood, however, that various implementations of the operating environment 100 can include zero, one, or more than one server computer 102; zero, one, or more than one network 104; zero, one, or more than one resource monitor 110; zero, one, two, three, or more than three resources 112, and/or zero, one, or more than one data store 120. As such, the illustrated embodiment should be understood as being illustrative, and should not be construed as being limiting in any way.

Figure 2:
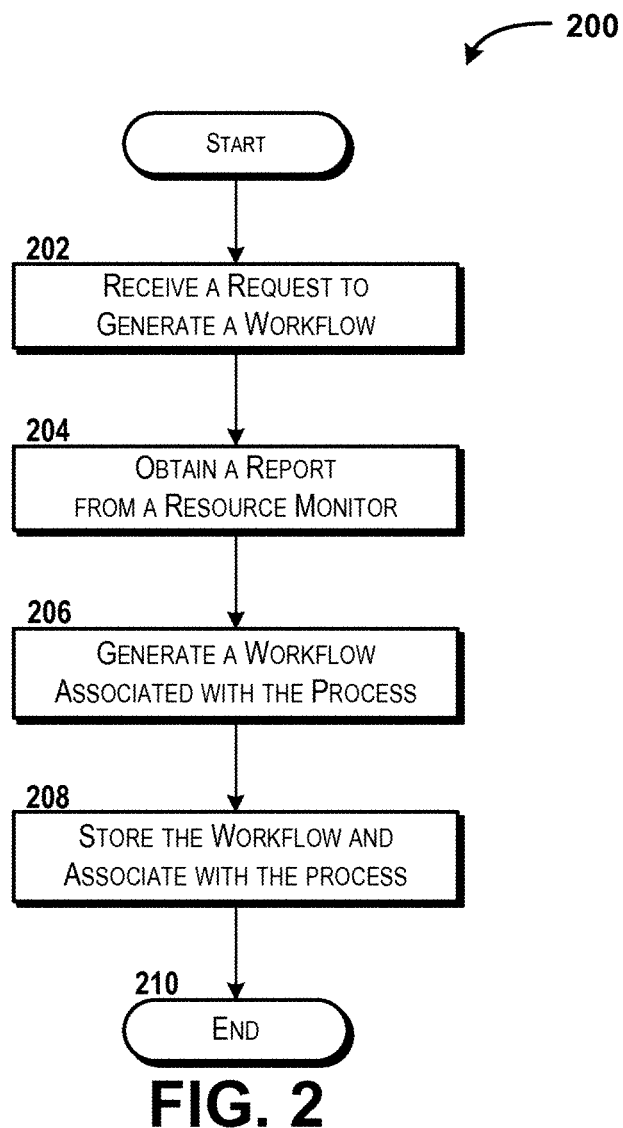
FIG. 2 is a flow diagram showing aspects of a method for generating a workflow, according to an illustrative embodiment of the concepts and technologies described herein.

Turning now to FIG. 2, aspects of a method 200 for generating a workflow 118 will be described in detail, according to an illustrative embodiment of the concepts and technologies described herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the resource management application 106. It should be understood that additional and/or alternative devices and/or network nodes can provide the functionality described herein via execution of one or more modules, applications, and/or other software including, but not limited to, the resource management application 106. Thus, the illustrated embodiments are illustrative, and should not be viewed as being limiting in any way.

The method 200 begins at operation 202. At operation 202, the server computer 102 can receive a request to generate a workflow 118. According to various embodiments, the request received in operation 202 can correspond to an explicit request, which can be received from a network operations entity, an application, a service, a customer of the resource management application 106, or another entity. The request received in operation 202 can correspond to a service call, an application call, combinations thereof, or the like. Additionally, or alternatively, the request received in operation 202 can correspond to an implicit request such as the server computer 102 detecting that a process has been introduced to the network 104, that a resource 112 has been introduced to the network 104, that a workflow 118 corresponding to a process does not exist, combinations thereof, or the like.

Also, as explained above with reference to FIG. 1, the server computer 102 can receive the workflows 118 and may or may not generate the workflows 118 in some embodiments. For example, as illustrated and described above, the workflows 118 may be generated by network personnel or other entities and therefore may or may not be generated by the resource management application 106 in some embodiments. Thus, it should be understood that the illustrated embodiment of FIG. 2 for generating the workflows 118 at the server computer 102 is illustrative of some embodiments and should not be construed as being limiting in any way.

From operation 202, the method 200 proceeds to operation 204. At operation 204, the server computer 102 can obtain a report 108 from a resource monitor 110. The resource monitor 110 can monitor one or more processes occurring at the resources 112 in some embodiments. In some other embodiments, the resource monitor 110 can receive information from one or more other devices or entities that monitor the resources 112. In yet other embodiments, the resources 112 can report to the resource monitor 110, and the resource monitor 110 can use the information obtained from the resources 112 to generate the reports 108. Regardless of how the monitoring information arrives at the resource monitor 110, the resource monitor 110 can determine, based upon the information included in the report 108, a process being performed by the resources 112, a path 116 associated with the process, time information relating to how resources 112 are utilized during the process from a timing standpoint, and/or other information.

From operation 204, the method 200 proceeds to operation 206. At operation 206, the server computer 102 can generate a workflow 118 associated with a process such as a process indicated in the report 108 obtained in operation 204 or a process identified in other ways. To generate the workflow 118, the server computer 102 can analyze the report 108 to identify the process associated with the report 108. In some embodiments, the process can be explicitly identified by the report 108. In some other embodiments, the report 108 may include information that enables the server computer 102 to determine the process.

In addition to identifying the process, the server computer 102 also can identify one or more resources 112 involved in the process identified. The server computer 102 can identify the resources 112 based on the report 108 and/or based on other data or information, which may be provided by the resource monitor 110 or other entities in communication with the server computer 102.

Additionally, the server computer 102 can identify a path 116 associated with the process. As explained above, the path 116 can identify a flow among or through the resources 112 in some embodiments. The path 116 also can identify, in some embodiments, resources 112 that are engaged or used during execution of the process by the resources 112. Thus, while traffic may or may not flow through some resources 112 during a process, the path 116 can indicate that those resources 112 are included in the path 116 by virtue of those resources 112 being engaged or used to execute any part of the process, to reroute traffic due to resource usage associated with resources 112 executing the process, or the like. Thus, it can be appreciated that a path 116 may include indications of resources 112 that are configured to handle traffic resulting from a particular process even if those resources 112 are not involved in executing the process. It should be understood that this example is illustrative and therefore should not be construed as being limiting in any way.

The server computer 102 also can identify time data or time information associated with the resources 112 and/or the use of resources 112 during the process. As explained in detail above, the time data can indicate a total elapsed time associated with a process, which can be defined from a time at which a first resource 112 associated with a process is first engaged or used to execute the process until a time at which a last resource 112 associated with the process is released from use. The time data also can indicate time ranges and/or specific times at or for which particular resources 112 are used, not used, engaged, or released, during the process. Thus, the time data and the path 116 can collectively be used to define, for a particular process, what resources 112 are used to execute a process, times at which those resources 112 are engaged during execution of the process, time periods for which the resources 112 are used during execution of the process, time periods for which the resources 112 are not used during execution of the process, and times at which the resources 112 are released during execution of the process. Because other times can be defined by the time data, it should be understood that these examples are illustrative and therefore should not be construed as being limiting in any way.

Through identifying the process, the path 116, the time data, and/or other data, the server computer 102 can generate the workflow 118. The workflow 118 can indicate, for a particular process, what resources 112 are involved or used during execution of the process, times for which the resources 112 are used and/or a time duration of the process, an order in which the resources 112 are used or engaged during the process, combinations thereof, or the like. It should be understood that these examples are illustrative and therefore should not be construed as being limiting in any way.

From operation 206, the method 200 proceeds to operation 208. At operation 208, the server computer 102 can store the workflow 118. The server computer 102 can store the workflows 118 in a format that can support queries or searches against the workflows 118. In some embodiments, the workflows 118 can be queried based upon a process identifier, an identifier for one or more resources 112, an identifier for a path 116, other information, combinations thereof, or the like. The workflows 118 also can be stored in other formats, and may be searched in a variety of ways other than executing queries or searches, as illustrated and described above with reference to FIG. 1. Regardless of a format in which the workflows 118 are generated or stored, the server computer 102 can be configured to store the workflows 118 at a data storage device such as the data store 120.

From operation 208, the method 200 proceeds to operation 210. The method 200 ends at operation 210.

Figure 3:
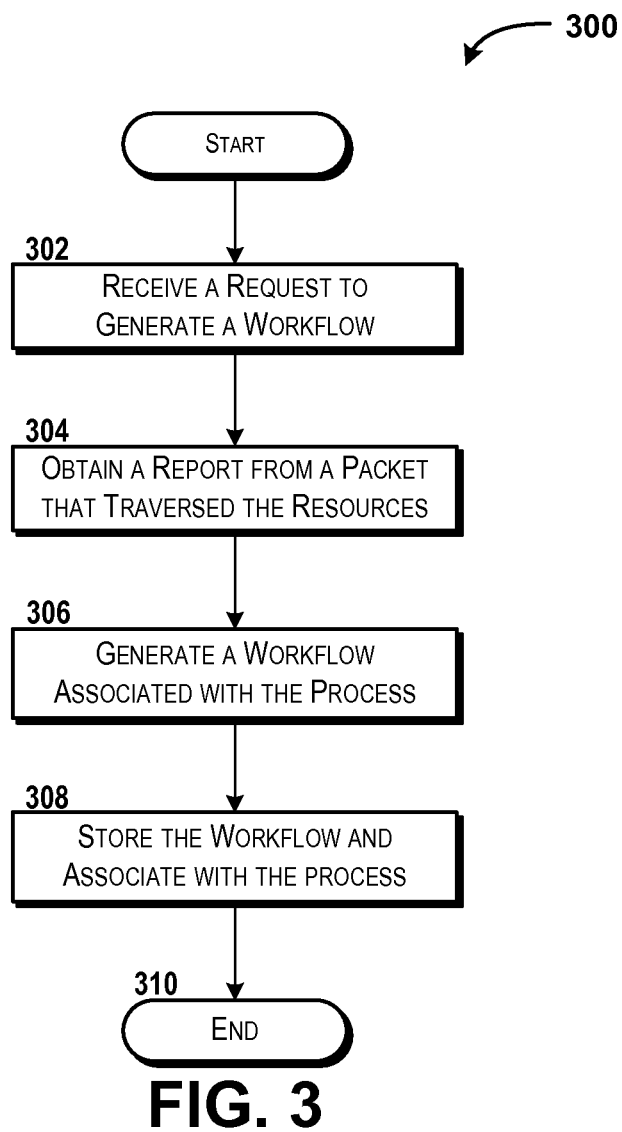
FIG. 3 is a flow diagram showing aspects of a method for generating a workflow, according to another illustrative embodiment of the concepts and technologies described herein.

Turning now to FIG. 3, aspects of a method 300 for generating a workflow 118 will be described in detail, according to another illustrative embodiment of the concepts and technologies described herein. The method 300 begins at operation 302. At operation 302, the server computer 102 can receive a request to generate a workflow 118. The request received in operation 302 can correspond to an explicit request or an implicit request as illustrated and described above with reference to FIG. 2. Furthermore, the request received in operation 302 can correspond to a service call, an application call, combinations thereof, or the like. The request received in operation 302 also can correspond to an implicit request such as the server computer 102 detecting that a process has been introduced to the network 104, the server computer 102 detecting that a workflow 118 corresponding to a process does not exist, combinations thereof, or the like. In some other embodiments as noted above, the server computer 102 can receive the workflows 118 from other entities and therefore may or may not generate the workflows 118. Thus, it should be understood that the illustrated embodiment of FIG. 3 for generating the workflows 118 at the server computer 102 is illustrative of some embodiments and should not be construed as being limiting in any way.

From operation 302, the method 300 proceeds to operation 304. At operation 304, the server computer 102 can obtain a report 108 from a packet 114 that traversed or engaged at least one of the resources 112. In some embodiments, of the concepts and technologies described herein, a packet 114 can be configured to include a flag, header, or other functionality for capturing and/or representing data that can indicate a process being performed by the resources 112, the path 116 associated with the process, time data associated with the process, and/or other data as illustrated and described above with regard to FIG. 1.

In some embodiments, the packet 114 can traverse or engage one or more of the resources 112 during execution of a process and capture this information, while in some embodiments the packet 114 can detect usage of resources 112 during a process without actually engaging or traversing those resources 112 during the process. It can be appreciated that multiple packets 114 may be created and/or used during a process as some traffic and/or packets 114 may or may not traverse each resource 112 used during a process.

After traversing the resources 112 and/or monitoring the resources 112 during a process, the packet 114 or packets 114 can be forwarded to the server computer 102 or the resource monitor 110 in some embodiments. In some other embodiments, the packet 114 or packets 114 can generate a report 108 that can be forwarded to the server computer 102 or the resource monitor 110. It can be appreciated that the report 108 in some embodiments can correspond to a log, a flag, a header or other representation of the path 116, the time data, the process, other data, or the like.

From operation 304, the method 300 proceeds to operation 306. At operation 306, the server computer 102 can generate a workflow 118 associated with a process such as a process indicated in the report 108 obtained in operation 304 or a process identified in other ways. To generate the workflow 118, the server computer 102 can analyze the report 108 to identify a process associated with the report 108. As noted above, the process can be explicitly identified by the report 108 or the report 108 may include information that enables the server computer 102 to determine the process.

In addition to identifying the process, the server computer 102 also can identify one or more resources 112 involved in the process. The server computer 102 also can identify a path 116 associated with the process. As explained above, the path 116 can identify a flow among or through the resources 112 in some embodiments. The path 116 also can identify, in some embodiments, resources 112 that are engaged or used during execution of the process by the resources 112, which can include direct involvement in the process such as executing or providing particular steps and/or indirect involvement such as supporting rerouted or redirected traffic due to the process.

The server computer 102 also can identify time data or time information associated with the resources 112 and/or the use of resources 112 during the process. Through identifying the process, the path 116, the time data, and/or other data, the server computer 102 can generate the workflow 118. The workflow 118 can indicate, for a particular process, what resources 112 are involved or used, times for which the resources 112 are used and/or a time duration of the process, an order in which the resources 112 are used or engaged during the process, combinations thereof, or the like. It should be understood that these examples are illustrative and therefore should not be construed as being limiting in any way.

From operation 306, the method 300 proceeds to operation 308. At operation 308, the server computer 102 can store the workflow 118. The server computer 102 can store the workflows 118 in a format that can support queries against the workflows 118 or in other formats that enable the server computer 102 to identify the workflows 118 based on identities of resources 112, processes, or other information. In some embodiments, the workflows 118 can be queried based upon a process identifier, an identifier for one or more resources 112, an identifier for a path 116, other information, combinations thereof, or the like. In some embodiments, the server computer 102 can store the workflows 118 at a data storage device such as the data store 120.

From operation 308, the method 300 proceeds to operation 310. The method 300 ends at operation 310.

Figure 4:
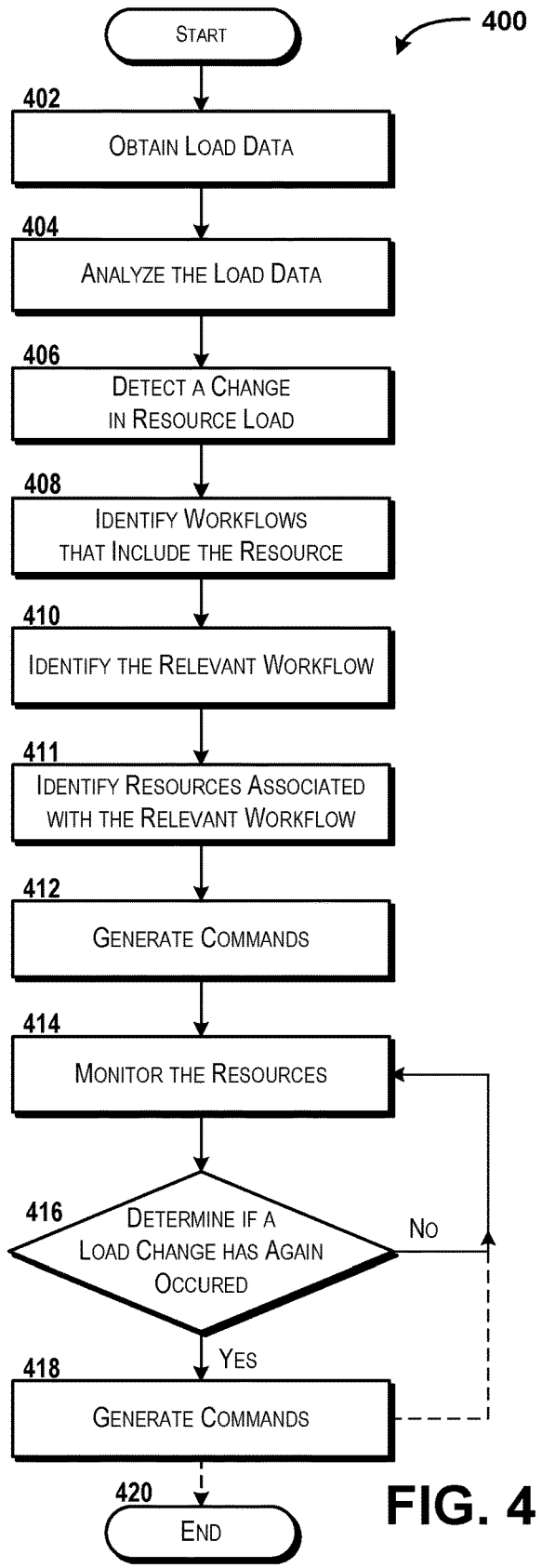
FIG. 4 is a flow diagram showing aspects of a method for managing resources using workflows, according to an illustrative embodiment of the concepts and technologies described herein.

Turning now to FIG. 4, aspects of a method 400 for managing resources 112 using workflows 118 will be described in detail, according to an illustrative embodiment of the concepts and technologies described herein. The method 400 begins at operation 402. At operation 402, the server computer 102 can obtain load data 122. According to various embodiments, the load data 122 can be obtained from the resource monitor 110 or other entities. The server computer 102 can request the load data 122 from the resource monitor 110, the resource monitor 110 can submit the load data 122 to the server computer 102 without receiving a request, the load data 122 can be downloaded and/or accessed by the server computer 102 without any requests, or the like. It should be understood that the server computer 102 can obtain the load data 122 in any number of manners, including but not limited to requesting the load data 122. As such, the above examples should not be construed as being limiting in any way.

From operation 402, the method 400 proceeds to operation 404. At operation 404, the server computer 102 can analyze the load data 122 received in operation 402. In operation 404, the server computer 102 can examine the load data 122 to determine one or more loads or capacities associated with one or more resources 112. The server computer 102 can compare the determined loads or capacities to known baselines or previous loads or capacities (from a previous iteration of the load data 122) or to other information. In some embodiments, the server computer 102 can access data or information indicating baseline loads or capacities associated with one or more of the resources 112. In some embodiments, for example, a report 108 can include historical loads or capacities associated with one or more of the resources 112, baseline values for loads or capacities, or the like. Thus, operation 404 can include comparing the load information included in the load data 122 with information from a report 108.

From operation 404, the method 400 proceeds to operation 406. At operation 406, the server computer 102 can detect a change in a resource load associated with one or more of the resources 112. As noted above, the analysis of operation 404 can include comparing a load or capacity of a resource 112 or multiple resources to previous loads or capacities, baseline loads or capacities, historical loads or capacities, or the like. Thus, the server computer 102 can determine, in operation 406, if the load or capacity associated with a resource 112 has changed. Because the server computer 102 can detect a resource load change in additional and/or alternative ways, it should be understood that this example is illustrative and therefore should not be construed as being limiting in any way.

It can be appreciated that the load detected in operation 406 sometimes may correspond to an increased resource load, but this is not necessarily the case. In other words, the server computer 102 can determine, in operation 406, that the resource load of one or more resources 112 has decreased. Thus, while the example of an increased resource load is discussed herein, it should be understood that this example is illustrative and should not be construed as being limiting in any way.

From operation 406, the method 400 proceeds to operation 408. At operation 408, the server computer 102 can identify one or more workflows 118 that include one or more resources 112 with which the one or more resource load change detected in operation 406 is associated. As explained above, the server computer 102 can query the workflows 118, in some embodiments, based upon a resource 112 determined to be associated with the resource load change detected in operation 406. Thus, the server computer 102 can query the workflows 118 and multiple workflows 118 may be returned by the query.

In some other embodiments, the server computer 102 may identify multiple resources 112 as being associated with multiple resource load changes and therefore may query the workflows 118 to identify one or more workflows 118 associated with the multiple resources 112. Thus, it can be appreciated that operation 408 can correspond to the server computer 102 executing a search or query against the workflows 118 based upon one or more identified resources 112 associated with one or more resource load changes.

In some embodiments, the workflows 118 may be stored as other types of files that may not support querying. As such, the server computer 102 can search the workflows 118 in operation 408 without executing a query against the workflows 118. Because the server computer 102 can identify workflows 118 in additional and/or alternative manners, it should be understood that these examples are illustrative and therefore should not be construed as being limiting in any way.

From operation 408, the method 400 proceeds to operation 410. At operation 410, the server computer 102 can identify one or more relevant workflows 118 from the workflows identified in operation 408. It can be appreciated that the server computer 102 may perform additional searches in operation 410 to determine which of the workflows 118 is or are relevant to the load change detected. In some embodiments, the server computer 102 may identify a process being executed by one or more resources 112 associated with a detected load change and therefore may identify the workflow 118 or workflows 118 associated with the identified process. Because the server computer 102 can identify one or more relevant workflows 118 in additional or alternative ways, it should be understood that these examples are illustrative and therefore should not be construed as being limiting in any way.

From operation 410, the method 400 proceeds to operation 411. In operation 411, the server computer 102 can analyze the relevant workflow 118 identified in operation 410 to identity each resource 112 associated with the relevant workflow 118. From operation 411, the method 400 can proceed to operation 412. In operation 412, the server computer 102 can generate one or more commands 124. The commands 124 can be generated to control one or more resources 112 associated with the relevant workflows 118 identified in operation 410, as identified in the analysis shown in operation 411. Because the resources 112 associated with the relevant workflow 118 can be identified in additional and/or alternative manners, this embodiment should be understood as being illustrative and should not be construed as being limiting in any way.

The commands 124 generated in operation 412 can be configured to control capacity associated with the one or more resources 112. The commands 124 can include instructions for increasing capacity of a resource 112, decreasing capacity of a resource 112, creating or activating a new resource 112, tearing down or deactivating a resource 112, or the like. The commands 124 also can include time data that can define time periods during which or times at which the capacity changes or other changes to the resources 112 are to be made. Thus, operation 412 can include determining time values associated with capacity changes to be made, in some embodiments.

As such, it can be appreciated that the illustrated operation 412 can be substituted with multiple operations. A first operation can correspond to determining anticipated load changes associated with the resources 112. A second of the operations can correspond to determining time information associated with the expected load changes. A third operation can correspond to generating the commands 124 and issuing the commands 124 to the one or more resources 112 to effect the changes. It should be understood that this example is illustrative and therefore should not be construed as being limiting in any way.

From operation 412, the method 400 proceeds to operation 414. At operation 414, the server computer 102 can monitor the resources 112 to which the commands 124 were issued and/or to the resources 112 identified in operation 412. It can be appreciated that in some instances, the capacity or load of a particular resource 112 may not change, notwithstanding that resource 112 being part of a relevant workflow 118. Thus, the server computer 102 can be configured to monitor any resources 112 associated with a relevant workflow 118, in some embodiments, whether or not commands 124 were issued to these resources 112. It should be understood that this example is illustrative and therefore should not be construed as being limiting in any way.

In executing the functionality illustrated in operation 414, the server computer 102 can request or otherwise obtain network or resource utilization information. Thus, it can be appreciated that in some embodiments, the server computer 102 can obtain load data 122 in operation 414. Thus, operation 414 can correspond to the server computer 102 obtaining and analyzing load data 122 associated with the resources 112 of the relevant workflow 118 or one or more relevant workflows 118, in some embodiments. It should be understood that the functionality of the server computer 102 performed with regard to operation 414 may be similar or event identical to the operations 402 and 404 illustrated and described above. It should be understood that this example is illustrative and therefore should not be construed as being limiting in any way.

From operation 414, the method 400 proceeds to operation 416. At operation 416, the server computer 102 can determine if a load change has again occurred at the resources 112 being monitored. As noted above, the server computer 102 can analyze the load data 122 or otherwise receive information indicating that the resource load of the resources 112 has changed. Because the resource load associated with the resources 112 can be determined to have changed in various manners, it should be understood that this example is illustrative and therefore should not be construed as being limiting in any way.

It should be understood that the server computer 102 can determine, in operation 416, if the resources 112 have experienced any type of load change. In some embodiments, the functionality of the server computer 102 in operation 416 can correspond to detecting that a spike in load of the resources 112 has occurred or ended. In some other embodiments, the server computer 102 can determine in operation 416 if a new increase in load is expected, or the like. Because load changes can be detected at operation 416 in a variety of ways, it should be understood that these examples are illustrative and therefore should not be construed as being limiting in any way.

If the server computer 102 determines, in operation 416, that a load change associated with the resources 112 being monitored has not occurred, the method 400 can return to operation 414, and the server computer 102 can again monitor the resources 112. If the server computer 102 determines, in any iteration of operation 416, that resource loads associated with one or more resources 112 being monitored has occurred, the method 400 can proceed to operation 418.

At operation 418, the server computer 102 can generate one or more commands 124. The commands 124 can be generated to further control the one or more resources 112 being monitored. The commands 124 generated in operation 418 can correspond to commands to increase load or capacity, commands to decrease load or capacity, or the like. In some embodiments, as explained in detail above, the commands 124 issued in operation 412 can include time data. The time data can provide instructions for how long to increase or decrease load, times at which the load is to be increased or decreased, or the like. As such, it can be appreciated that operation 418 may or may not be omitted in some embodiments of the concepts and technologies described herein.

From operation 418, the method 400 can return to operation 414 in some embodiments. Thus, it can be appreciated that the execution of the method 400 can repeat operations 414-418 until the execution is interrupted or terminated. In some other embodiments, the method 400 can proceed to operation 420. The method 400 ends at operation 420.

Figure 5:
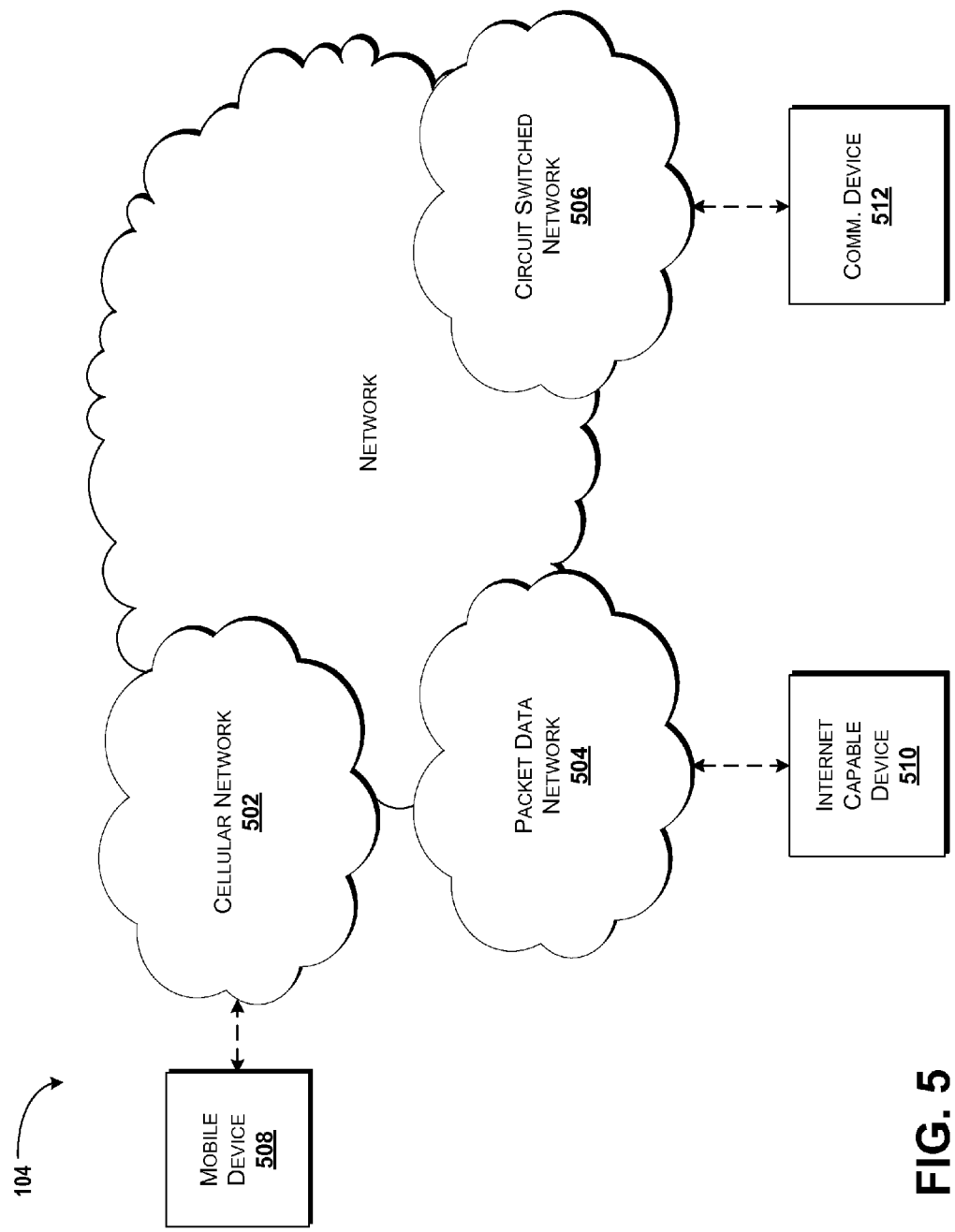
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
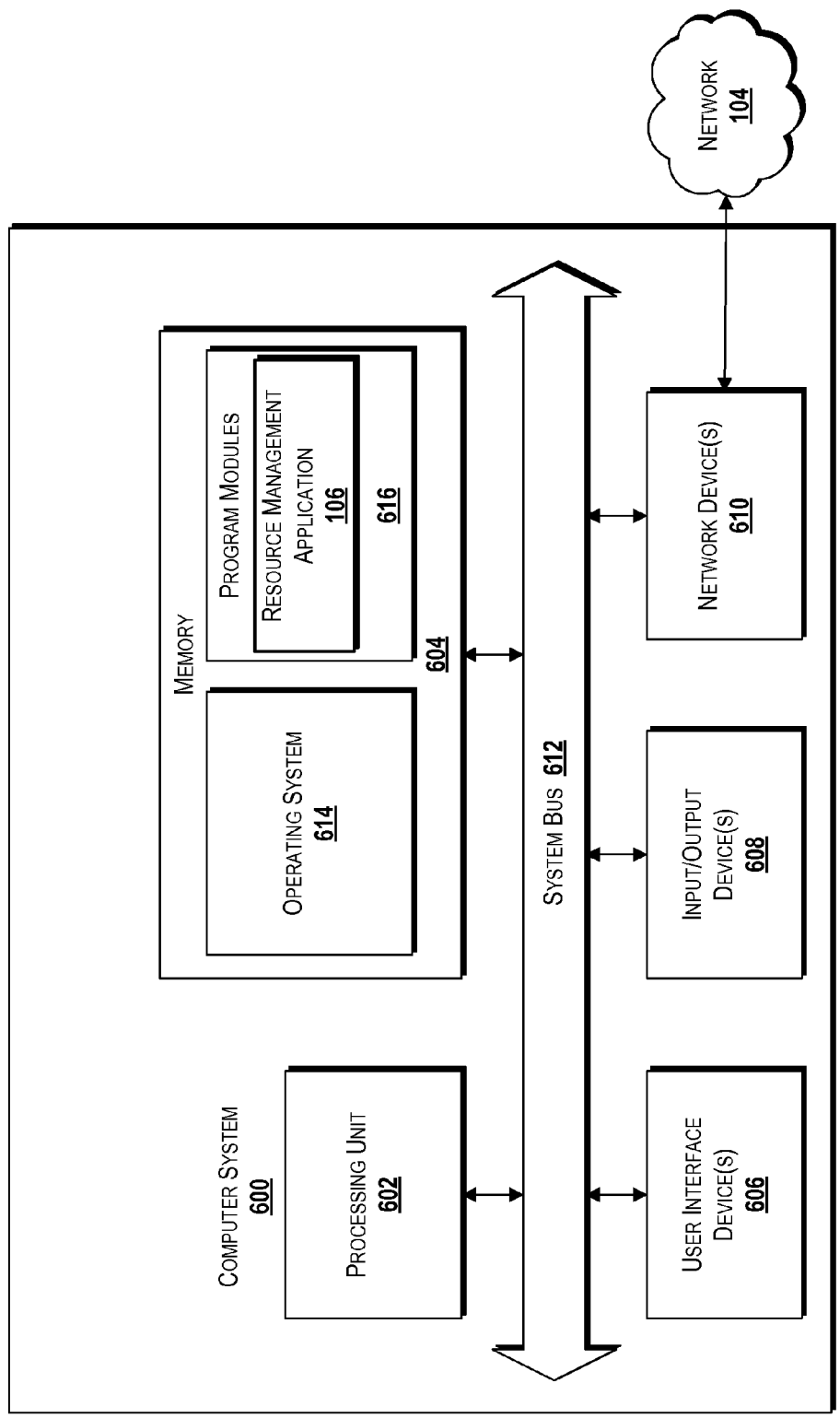
FIG. 6 is a block diagram illustrating an example computer system configured to provide workflow-based resource management, according to some illustrative embodiments of the concepts and technologies described herein.

FIG. 6 is a block diagram illustrating a computer system 600 configured to provide the functionality described herein for workflow-based resource management, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the resource management application 106. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the reports 108; the packets 114; the path 116; data indicating processes, time data, or the like; the workflows 118; the load data 122; the commands 124; and/or other data; if desired.

In some embodiments, the resources 112 can have an architecture that can be similar to the computer system 600 illustrated and described herein. In yet other embodiments, the resources 112 can be stored by the computer system 600 and therefore can be virtual machines that may be hosted and/or executed by the computer system 600. It should be understood that this example is illustrative and therefore should not be construed as being limiting in any way.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for workflow-based resource management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
   obtaining, at a processor executing a resource management application, load data that describes a resource load associated with a first network resource that is executing a process on a communication network, wherein the load data is received via the communication network;
   accessing, by the processor, workflows comprising data that describes network resources that are utilized during execution of processes on the communications network, wherein the processes comprise the process, and wherein the workflows comprise a particular workflow that relates to the process being executed;

identifying, by the processor, the process being executed;

identifying, by the processor and based on an identity of the process being executed, the particular workflow, wherein the particular workflow identifies the first network resource as being used at a first time during execution of the process, wherein the particular workflow also identifies a second network resource as being used at a second time during execution of the process, and wherein the second time comprises an elapsed time from a beginning of execution of the process by the first network resource; and issuing, by the processor and based on the particular workflow, a command to the second network resource that is identified by the particular workflow, wherein the command comprises instructions that instruct the second network resource to proactively adjust, by a first percentage, a capacity of the second network resource at the elapsed time during execution of the process, wherein the elapsed time corresponds to the second time identified by the particular workflow, and wherein in response to receiving the command, the second network resource generates a token that indicates the first percentage by which the capacity of the second network resource was adjusted; and transmits the token to a third network resource of the plurality of network resources, wherein in response to receiving the token, the third network resource proactively adjusts a further capacity of the third network resource by the first percentage indicated by the token, generates a further token that indicates a second percentage by which a fourth network resource should adjust a capacity of the fourth network resource, wherein the second percentage comprises the first percentage minus an amount that corresponds to dropped traffic between the third network resource and the fourth network resource, and transmits the further token to a fourth network resource of the plurality of network resources to cause the fourth network resource to proactively adjust the capacity of the fourth network resource by the second percentage.

2. The method of claim 1, further comprising:

monitoring the first network resource and the second network resource to determine if a further change in resource load has occurred during execution of the process.

3. The method of claim 1, wherein the load data is obtained from a resource monitor.

4. The method of claim 1, wherein the particular workflow is generated by the processor, and wherein generating the particular workflow comprises:

obtaining a report that identifies the process, a first utilization associated with the first network resource during a previous execution of the process, a first time during the previous execution of the process at which the first network resource was used at the first utilization, a second utilization associated with the second network resource during the previous execution of the process, and a second time during the previous execution of the process at which the second network resource was used at the second utilization;

generating the particular workflow based upon the report; and storing the particular workflow.

5. The method of claim 4, wherein the report is based on information received from a packet that traversed the plurality of network resources during the previous execution of the process.

6. The method of claim 4, wherein the report comprises data that indicates baseline loads associated with the plurality of network resources.

7. The method of claim 6, wherein analyzing the load data to detect the change in resource load comprises comparing the load data to the data that indicates baseline loads to detect the change in resource load.

8. The method of claim 1, wherein the dropped traffic comprises traffic that does not continue execution of the process after traversing the third network resource.

9. A system comprising:

a processor; and a memory that stores computer-executable instructions that, when executed by the processor, cause the processor to perform operations comprising:

obtaining load data that describes a resource load associated with a first network resource that is executing a process on a communication network, wherein the load data is received via the communications network;

accessing workflows comprising data that describes network resources that are utilized during execution of processes on the communications network, wherein the processes comprise the process, and wherein the workflows comprise a particular workflow that relates to the process being executed, identifying the process being executed, identifying, based on an identity of the process being executed, the particular workflow, wherein the particular workflow identifies the first network resource as being used at a first time during execution of the process, wherein the particular workflow also identifies a second network resource as being used at a second time during execution of the process, and wherein the second time comprises an elapsed time from a beginning of execution of the process by the first network resource, and issuing, based on the particular workflow, a command to the second network resource that is identified by the particular workflow, wherein the command comprises instructions that instruct the second network resource to proactively adjust, by a first percentage, a capacity of the second network resource at the elapsed time during execution of the process, wherein the elapsed time corresponds to the second time identified by the particular workflow, and wherein in response to receiving the command, the second network resource generates a token that indicates the first percentage by which the capacity of the second network resource was adjusted; and transmits the token to a third network resource of the plurality of network resources, wherein in response to receiving the token, the third network resource proactively adjusts a further capacity of the third network resource by the first percentage indicated by the token, generates a further token that indicates a second percentage by which a fourth network resource should adjust a capacity of the fourth network resource, wherein the second percentage comprises the first percentage minus an amount that corresponds to dropped traffic between the third network resource and the fourth network resource, and transmits the further token to a fourth network resource of the plurality of network resources to cause the fourth network to proactively adjust the capacity of the fourth network resource by the second percentage.

10. The system of claim 9, wherein the particular workflow is generated by:

obtaining a report that identifies the process, a first utilization associated with the first network resource during a previous execution of the process, a first time during the previous execution of the process at which the first network resource was used at the first utilization, a second utilization associated with the second network resource during the previous execution of the process, and a second time during the previous execution of the process at which the second network resource was used at the second utilization;

generating the particular workflow based upon the report; and storing the particular workflow.

11. The system of claim 10, wherein the report comprises data that indicates baseline loads associated with the plurality of network resources, and wherein analyzing the load data to detect the change in resource load comprises comparing the load data to the data that indicates baseline loads to detect the change in resource load.

12. The system of claim 10, wherein the report is based on information received from a packet that traversed the plurality of network resources during the previous execution of the process.

13. The system of claim 9, wherein the dropped traffic comprises traffic that does not continue execution of the process after traversing the third network resource.

14. A computer storage medium having computer-executable instructions stored thereon that, when executed by a processor, cause the processor to perform operations comprising:

obtaining load data that describes a resource load associated with a first network resource that is executing a process on a communications network, wherein the processes comprise the process, and wherein the load data is received via the communications network;

accessing workflows comprising data that describes network resources that are utilized during execution of processes on the communications network, wherein the workflows comprise a particular workflow that relates to the process being executed;

identifying the process being executed;

identifying, based on an identity of the process being executed, the particular workflow, wherein the particular workflow identifies the first network resource as being used at a first time during execution of the process, wherein the particular workflow also identifies a second network resource as being used at a second time during execution of the process, and wherein the second time comprises an elapsed time from a beginning of execution of the process by the first network resource; and issuing a command, based on the particular workflow, to the second network resource that is identified by the particular workflow, wherein the command comprises instructions that instruct the second network resource to proactively adjust, by a first percentage, a capacity of the second network resource at the elapsed time during execution of the process, wherein the elapsed time corresponds to the second time identified by the particular workflow, and wherein in response to receiving the command, the second network resource generates a token that indicates the first percentage by which the capacity of the second network resource was adjusted; and transmits the token to a third network resource of the plurality of network resources, wherein in response to receiving the token, the third network resource proactively adjusts a further capacity of the third network resource by the first percentage indicated by the token, generates a further token that indicates a second percentage by which a fourth network resource should adjust a capacity of the fourth network resource, wherein the second percentage comprises the first percentage minus an amount that corresponds to dropped traffic between the third network resource and the fourth network resource, and transmits the further token to a fourth network resource of the plurality of network resources to cause the fourth network resource to proactively adjust the capacity of the fourth network resource by the second percentage.

15. The computer storage medium of claim 14, wherein the particular workflow is generated by:

obtaining a report that identifies the process, a first utilization associated with the first network resource during a previous execution of the process, a first time during the previous execution of the process at which the first network resource was used at the first utilization, a second utilization associated with the second network resource during the previous execution of the process, and a second time during the previous execution of the process at which the second network resource was used at the second utilization;

generating the particular workflow based upon the report; and storing the particular workflow.

16. The computer storage medium of claim 15, wherein the report comprises data that indicates baseline loads associated with the plurality of network resources, and wherein analyzing the load data to detect the change in resource load comprises comparing the load data to the data that indicates baseline loads to detect the change in resource load.

17. The computer storage medium of claim 15, wherein the report is based on information received from a packet that traversed the plurality of network resources during the previous execution of the process.

18. The computer storage medium of claim 14, wherein the dropped traffic comprises traffic that does not continue execution of the process after traversing the third network resource.

* * * * *